Patented Jan. 15, 1935

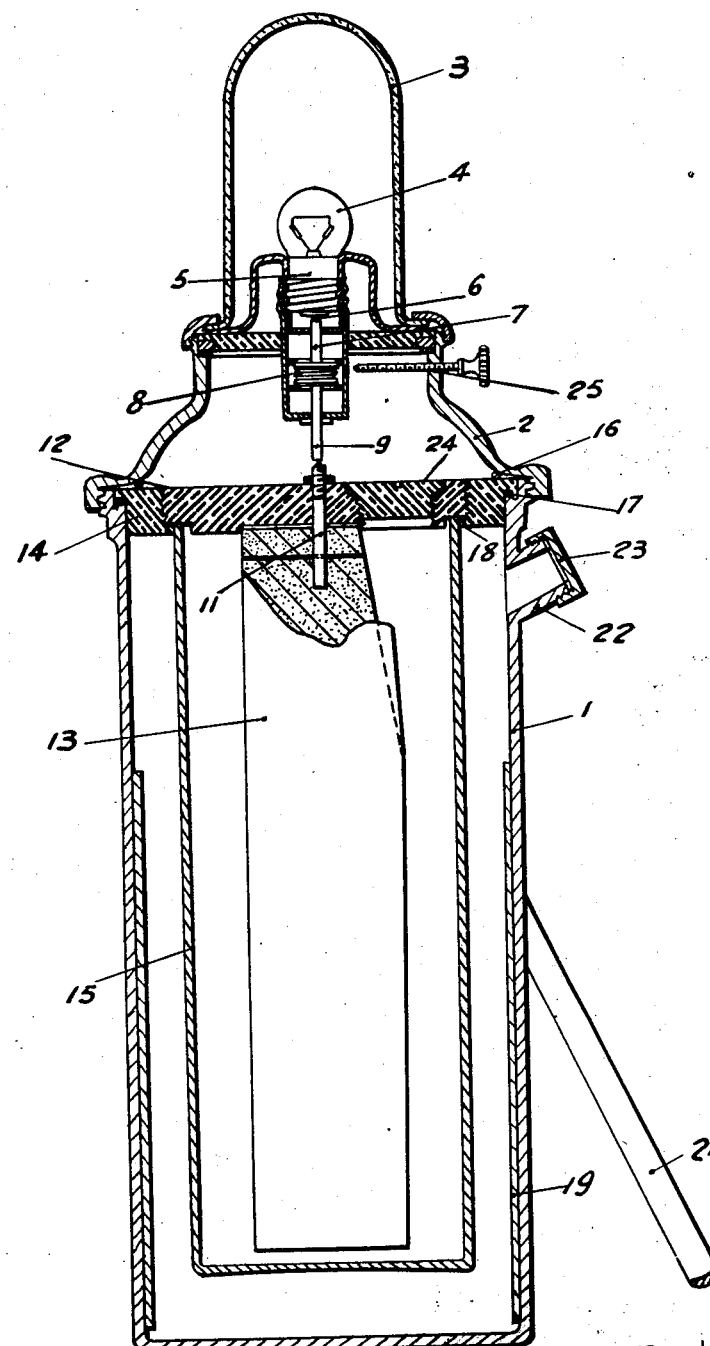

1,988,139

UNITED STATES PATENT OFFICE 1,988,139

TWO-LIQUID CELL

Joseph Pellini, Paris, France

Application October 1, 1932, Serial No. 635,825
In France October 28, 1931

1 Claim. (Cl. 136—95)

Electric cells are already known which contain two liquids separated by a diaphragm. In cells of this type used heretofore the liquids used respectively as an exciter and a depolarizer are constituted by mixtures which must be prepared prior to their introduction into the cell.

My invention has for its object a cell of the above mentioned type wherein the exciter and the depolarizer are constituted by solid matter which may be introduced under this form into the cell, filled previously with water or not. The advantages of this manner of feeding the cell are apparent as the substances necessary for its working appear under an exceedingly reduced volume and weight and are easily and cheaply transported. Their handling is also quite safe whereas the liquid exciters and depolarizers which always contain hydrochloric or sulphuric acid are always more or less dangerous to handle. My solid cell exciter and depolarizer may be prepared under pulverized, granular or compressed form. The exciter material is not hygroscopic and does not fall in powder when in contact with the air whereas the depolarizer retains its original state forever when suitably packed.

In all cases the solid exciter and depolarizer retain permanently the entirety of their active properties. Of course they do not evolve any gases as they are adapted to feed a hermetically closed cell.

According to my invention these products are constituted by a dehydrated mixture of magnesium or zinc chloride, of sodium sulphate and sulphuric acid for the exciter and by a dehydrated mixture of sodium bichromate, of magnesium chloride and sulphuric acid for the depolarizer, the said products being subsequently dried.

It should be noted that the composition of the exciter and the composition of the depolarizer depend one on the other. I may use as preferred proportions:

(a) Exciter

Magnesium chloride_____ 10 gr.
Sodium sulphate_____ 30 gr.
Sulphuric acid_____ 5 gr.

or

Zinc chloride_____ 10 gr.
Sodium sulphate_____ 30 gr.
Sulphuric acid_____ 5 gr.

(b) Depolarizer

Sodium bichromate_____ 30 gr.
Magnesium chloride_____ 18 gr.
Sulphuric acid_____ 72 gr.

The salts are dried and the sulphuric acid dehydrated before mixture.

The mixtures are dried thereafter in suitable devices in a room the temperature of which is held between 28 and 30° C.

I have shown by way of example a form of execution of a cell according to my invention in accompanying drawing.

This cell comprises a metal container 1 outwardly threaded at its upper end for receiving the metal cover 2 wherein is fitted the glass bulb 3 protecting the electric lamp 4 the threaded plug 5 of which is provided with a terminal 6 bearing against a spindle 7 urged upwards by a spring 8. The lower end of this spring urges a second spindle 9 against a terminal 11 passing through the insulating plate 12 for establishing a connection with the carbon electrode 13. The insulating plate 12 is outwardly threaded and is screwed into an insulating collar, say of ebonite, 14 fitted inside the edge of the container 1. This collar also supports the porous jar 15 separating the two liquids of the cell and providing an inner and an outer chamber therein. Packings 16, 17, 18 ensure perfect watertightness of the cell. The zinc electrode 19 is arranged in the outer part of the container 1. A U-shaped handle 21 is provided for carrying the cell. The latter opens into the atmosphere only through the threaded connection 22 closed by the watertight plug 23 and through an aperture provided in the plate 12 and adapted to be closed by the threaded watertight plug 24. The plugs 23 and 24 afford an access into the parts of the cell which are respectively on the outside and on the inside of the porous jar. A threaded rod 25 provided with a knob is adapted to provide a body contact with the outside of the socket of the lamp 4 whereby the cell circuit is closed and the lamp ignited.

For reloading the battery I remove the plug 23 and I introduce through the connection 22 either the exciter previously prepared by dissolving the dry exciter mixture in water or first water and then the dry exciter forming for instance pastilles. I then close the plug or cap 23 after which I unscrew the cover 2 and then the plug 24. I may now introduce inside the porous jar either the depolarizing solution of the dry depolarizer mixture in water or first water and then the dry depolarizer forming also for instance pastilles. The plug and cover are then screwed down again whereby the cell is perfectly closed.

For a cell of ordinary size of say 135 mm × 85 mm, I may use 45 gr. of exciter and 120 gr. of depolarizer together with a total volume of water of 38 centilitres. This provides a power of 1½ watt for a continuous working of eight hours during which the discharge curve remains substantially horizontal. The cell provides thus a large output for continuous operation. It may also work intermittently with the same chemicals during a time which depends on the rate of compression of the mixtures.

Beyond the numerous advantages already mentioned, experience shows that the above products do not give birth to crystals creeping up the zinc or the carbon.

What I claim is:

An electric hermetically closed cell providing a substantially constant intensity output without evolving any gases comprising a container, a porous diaphragm dividing said container into two chambers, a carbon electrode in one chamber, a zinc electrode in the other chamber, a dry depolarizer and a dry exciter the watery solutions of which are adapted to fill the first and second chambers respectively, the depolarizer being constituted by a dried mixture of dehydrated sodium bichromate, magnesium chloride and sulphuric acid and the exciter being constituted by a dried mixture of dehydrated chloride of metal selected from magnesium and zinc, sodium sulphate and sulphuric acid.

JOSEPH PELLINI.